United States Patent [19]

Vincent et al.

[11] 3,764,555

[45] Oct. 9, 1973

[54] PROCESS OF PREPARING POROSITY-FREE CALCIUM HALOPHOSPHATE PHOSPHORS

[75] Inventors: Thomas C. Vincent, Mayfield Heights; Arnold Friedman, South Euclid; Robert L. Hickok, Richmond Heights, all of Ohio

[73] Assignee: General Electric Company, Schenectady, N.Y.

[22] Filed: Oct. 15, 1970

[21] Appl. No.: 90,232

Related U.S. Application Data

[63] Continuation of Ser. No. 731,594, May 23, 1968, abandoned.

[52] U.S. Cl. .................... 252/301.6 P, 252/301.4 P
[51] Int. Cl. .............................................. C09k 1/36
[58] Field of Search ................ 252/301.4 P, 301.6 P

[56] References Cited
UNITED STATES PATENTS

| | | | |
|---|---|---|---|
| 3,242,369 | 3/1966 | King et al. ..................... | 252/301.4 P |
| 3,432,769 | 3/1969 | Kingsley et al. ............... | 252/301.4 P |
| 3,468,812 | 9/1969 | Wanmaker et al. ........... | 252/301.4 P |
| 3,505,012 | 4/1970 | Dale et al. ..................... | 252/301.4 P |
| 3,505,239 | 4/1970 | Mazelsky et al. .............. | 252/301.4 P |
| 3,538,014 | 11/1970 | Wachtel ........................ | 252/301.4 P |
| 3,549,553 | 12/1970 | Wachtel ........................ | 252/301.4 P |
| 3,575,876 | 4/1971 | Piper ............................. | 252/301.4 P |
| 3,575,877 | 4/1971 | Bertsch......................... | 252/301.4 P |
| 3,578,603 | 5/1971 | Dale et al. ..................... | 252/301.4 P |
| 3,598,751 | 8/1971 | Frese et al. .................... | 252/301.4 P |
| 2,488,733 | 11/1949 | McKeag et al. ............... | 252/301.4 P |
| 2,826,553 | 3/1958 | Butler........................... | 252/301.4 P |
| 2,904,516 | 9/1959 | Ross et al. ..................... | 252/301.4 P |
| 2,968,626 | 1/1961 | Rimbach ....................... | 252/301.4 P |

*Primary Examiner*—Oscar R. Vertiz
*Assistant Examiner*—J. Cooper
*Attorney*—Henry P. Truesdell, John F. McDevitt, Frank L. Neuhauser, Oscar B. Waddell and Joseph B. Forman

[57] ABSTRACT

A process for the production of relatively porosity-free calcium halophosphate phosphors activated such as with antimony and manganese. The process involves using either calcium pyrophosphate, $Ca_2P_2O_7$, or tribasic calcium ortho-phosphate, $Ca_3(PO_4)_2$, as the phosphate ingredient in a batch of ingredients containing the constituent elements of the desired phosphor. The batch is fired at an elevated temperature for a time sufficient to produce the phosphor. The extent of freedom from porosity of the phosphor can be characterized by the slope of a line obtained by plotting a graph of log $I/I_o$ versus $mg/mm^2$ wherein $I/I_o$ is the ratio of the intensity of light transmitted in a forward direction through a sample of the phosphor in particulate form suspended in a liquid of essentially matching index of refraction to the intensity of the light transmitted without the phosphor, and $mg/mm^2$ is the concentration of the phosphor measured in milligrams of phosphor per square millimeter of light beam. A slope less negative than $-2.7$ $mm^2/mg$ is within the invention.

2 Claims, 6 Drawing Figures

PHOSPHOR FROM CaHPO$_4$
REFRACTIVE INDEX OF LIQUID: 1.634

Inventors:
Thomas C. Vincent
Arnold I. Friedman
Robert L. Hickok
by Richard H. Burgess
Their Attorney PHOSPHOR FROM $Ca_2P_2O_7$
REFRACTIVE INDEX OF LIQUID: 1.634

PHOSPHOR FROM $Ca_2P_2O_7$
REFRACTIVE INDEX OF LIQUID: 1.458

Inventors:
Thomas C. Vincent
Arnold I. Friedman
Robert L. Hickok
by Richard H. Burgess
Their Attorney Inventors:
Thomas C. Vincent
Arnold I. Friedman
Robert L. Hickok
by Richard H. Burgess
Their Attorney

PROCESS OF PREPARING POROSITY-FREE CALCIUM HALOPHOSPHATE PHOSPHORS

This application is a continuation of application Ser. No. 731,594, filed May 23, 1968, now abandoned.

BACKGROUND OF THE INVENTION

This invention relates to a process for producing calcium halophosphate phosphor with improved transparency to light. More particularly, it relates to such a process utilizing different starting materials than traditional processes.

Traditionally, calcium halophosphate phosphors have been produced by firing batches of mixed ingredients in which the phosphate is provided in the form of dibasic calcium acid phosphate, $CaHPO_4$. The $CaHPO_4$ is the predominant ingredient, and it has a major influence on the properties of the resulting phosphor. Such phosphors are normally characterized by porosity within the particles of phosphor. This porosity decreases the direct transparency of the phosphor and diminishes its utility for the production of light.

Calcium halophosphate phosphors used in fluorescent lamps are chemically and structurally related to calcium fluorapatite, $Ca_{10}F_2(PO_4)_6$. These phosphors normally contain divalent manganese, $Mn^{+2}$, and trivalent antimony, $Sb^{+3}$, as activator and coactivator or sensitizer respectively, which are substituted for part of the calcium. Some phosphors are prepared in which cadmium, $Cd^{+2}$, is also substituted for part of the calcium. Proper color balance of the emitted light is achieved by substituting chloride for part of the fluoride. Charge compensation to accommodate the $Sb^{+3}$ is achieved by substitution of divalent oxygen, $O^{-2}$, for part of the monovalent halogen, $X^{-1}$. A calcium halophosphate phosphor might typically have an empirical formula similar to

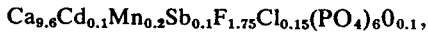

$Ca_{9.6}Cd_{0.1}Mn_{0.2}Sb_{0.1}F_{1.75}Cl_{0.15}(PO_4)_6O_{0.1}$, or, more generally stated,

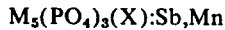

$M_5(PO_4)_3(X):Sb,Mn$ wherein M is Ca which may have small amounts of Cd substitution, and X is halogen selected from the group consisting of F, Cl, and mixtures thereof. In addition to or in partial substitution for calcium, other divalent cations may, as is known in the art, be used such as cadmium, strontium, barium, magnesium and zinc, preferably in amounts less than 0.50 atoms per mole of phosphor.

Synthesis of halophosphate phosphors is essentially carried out by firing at high temperatures, i.e., 1000° to 1200°C, a mixture of reactants which can include $CaHPO_4$, $CaCO_3$, CdO, $MnCO_3$, $Sb_2O_3$, $CaF_2$ and $NH_4Cl$. The ingredients other than $CaHPO_4$ can be used as commercially available and as well known in the art. It is preferable to use $CaHPO_4$ which has been produced in certain manners to optimize it for phosphor production. One desirable and known process for producing lamp grade $CaHPO_4$ involves first reacting $(NH_4)_2HPO_4$ with $CaCl_2$ in water to precipitate $CaHPO_4 \cdot 2H_2O$. This is then filtered, washed and reslurried with water and then recrystallized preferably at 80° to 100°C to remove the waters of hydration and give the $CaHPO_4$ which can then be used to blend with other phosphor constituents. After first firing to form the phosphor, the reacted product is comminuted and blended and then can be fired again to obtain optimum reaction and homogeneity in the product. The product calcium halophosphate phosphor is then suspended and used to coat lamp tubes.

SUMMARY OF THE INVENTION

A primary object of the invention is to provide an efficient and practical process for the production of calcium halophosphate phosphors with minimum porosity. Another aspect of the objects of the invention is to provide such phosphors with very little porosity and as high a degree of transparency as possible for optimum transmission of light produced by the phosphor.

Further objects and advantages of the invention will appear from the following detailed description of species thereof and from the accompanying drawings.

Briefly stated, the present invention provides in certain of its aspects a process wherein a batch of ingredients containing the constituent elements of the desired phosphor is fired at temperatures sufficiently elevated and for a time sufficient to form the phosphor, the phosphate ingredient in the batch being supplied at least predominantly in the form of at least one of calcium pyrophosphate, $Ca_2P_2O_7$, or tribasic calcium orthophosphate, $Ca_3(PO_4)_2$, with essentially no dibasic calcium phosphate, $CaHPO_4$, present in the batch.

In one preferred embodiment of the invention, the ingredients of the batch in addition to the phosphate ingredient include $CaCO_3$, $CaF_2$, CdO (or equivalents such as $CdCO_3$ which decompose to CdO), $NH_4Cl$, $Sb_2O_3$, and $MnCO_3$.

In one preferred process, the batch is fired at about 1000° to 1200°C for about one to two hours, the batch is then communited and blended and then fired again at about 1000° to 1200°C for about one to two hours.

The phosphors produced by these processes differ from prior art phosphors and furthermore can be characterized by their relative freedom from porosity as measured by a low degree of scattering of transmitted white light when said phosphor is suspended in a liquid of essentially matching refractive index. The extent of porosity is measured by the slope of the line obtained by plotting, vertically, the logarithm of the intensity of light transmitted through the suspended phosphor divided by the intensity of the light transmitted through the liquid without the phosphor versus, horizontally, the concentration of the phosphor in milligrams per square millimeter in the light beam path. For the purposes of the invention, the slope of this line is less negative than −2.7. Preferably, the slope is less negative than −2.3.

DESCRIPTION OF THE PREFERRED EMBODIMENTS

Figure 1:
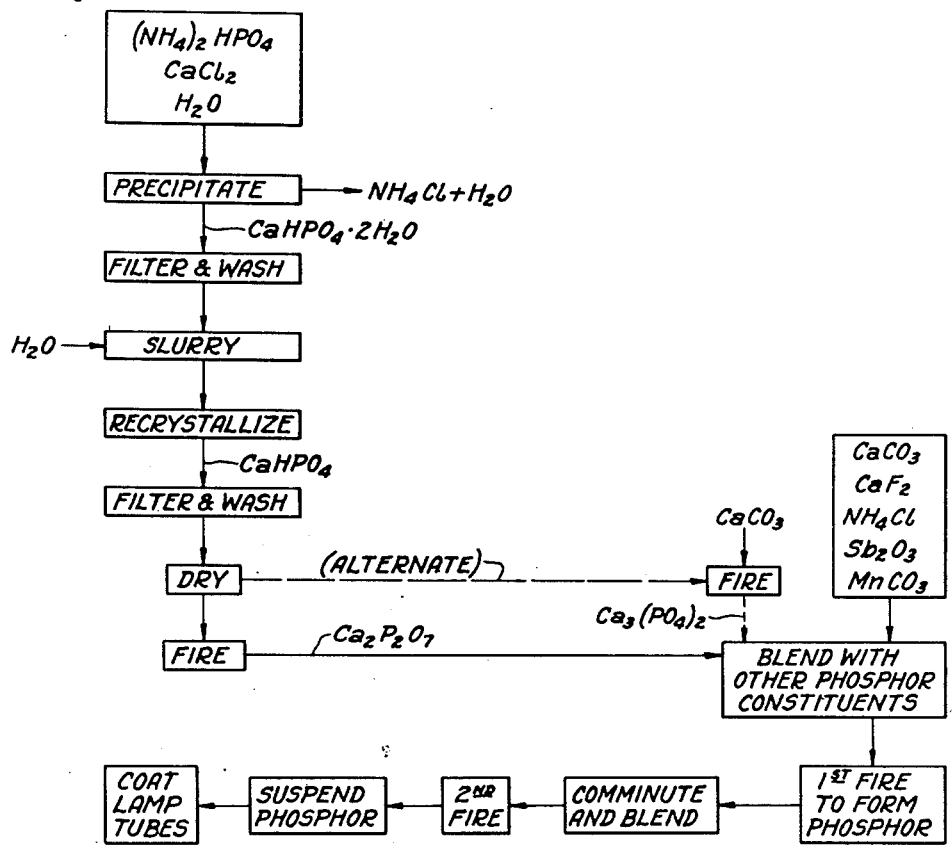
FIG. 1 is a flow sheet of phosphor production and use showing the relationships of the steps of the present invention to an overall process producing and using calcium halophosphate phosphors.

The integrated processes of producing and using calcium halophosphate phosphors are outlined in the flow sheet of FIG. 1. In the prior art, the recrystallized $CaHPO_4$ is used as the phosphate-containing ingredient to blend with the other phosphor constituents and thereafter to form the phosphor. In addition to the batch ingredients shown in FIG. 1, CdO or $CdCO_3$ can be added to improve maintenance of the phosphor. There are two alternate forms of the present invention. In one form $Ca_2P_2O_7$ is produced by firing $CaHPO_4$. This $Ca_2P_2O_7$ is then blended with the other phosphor constituents used to produce the phosphor. The alternate process is to fire the recrystallized $CaHPO_4$ with $CaCO_3$ to produce $Ca_3(PO_4)_2$ which is blended with the other phosphor constituents to produce the phosphor.

It should be recognized that the $Ca_2P_2O_7$ or $Ca_3(PO_4)_2$ are provided to the batch to be mixed with the other ingredients necessary to form the phosphor on firing. This is different from the formation of either of these phosphate intermediates during the production of the phosphor. It is also different from using either of these compounds which have been reacted with halides before providing them to the phosphor batch itself. A principal reason for these differences is that the selected phosphate ingredient of the invention must be formed in the absence of deleterious other materials such as halides which could diffuse inwardly, at the same time as hydrogen ions or other impurities are diffusing outwardly from the particles resulting in the formation of lattice vacancies which coalesce into voids.

Although the mechanisms of phosphor formation are not perfectly known, and the reasons for the success of applicants' process in producing relatively porosity-free phosphor are not completely understood, one hypothesis is that pores result in traditional phosphor manufacture when hydrogen ions and other impurities are diffusing outwardly from $CaHPO_4$ at the same time as certain other phosphor ingredients, particularly such as fluorine and chlorine, are diffusing inwardly.

Thus, applicants' invention in part resides in utilizing as the phosphate ingredient a calcium phosphate which does not contain extra hydrogen or impurity ions which would have to diffuse out of the matrix. It is also important that these phosphate intermediates be formed in a halide-free condition to avoid porosity. Since the phosphate intermediate is the predominant species in production of calcium halophosphate phosphors, and since it is known that the other ingredients do indeed diffuse into the phosphate the pore-free nature of phosphate intermediates is very desirable in controlling porosity in the phosphors themselves.

To produce $Ca_2P_2O_7$ suitable for the invention, phosphor grade $CaHPO_4$ can be fired at 900° to 1230°C for one to three hours.

To produce suitable $Ca_3(PO_4)_2$, phosphor grade $CaHPO_4$ can be blended with $CaCO_3$ in a 2:1 molar ratio and fired at 1100°–1300°C for 2–4 hours.

A suitable batch for preparing a calcium halophosphate phosphor with a (Ca + Mn + Cd)/$PO_4$ base to acid ratio of 9.86/6 of the type known as a cool white phosphor using $Ca_2P_2O_7$ is:

| Ingredient | Moles | Grams |
|---|---|---|
| $Ca_2P_2O_7$ | 0.5000 | 127.06 |
| $CaCO_3$ | 0.4476 | 44.80 |
| $CaF_2$ | 0.1500 | 11.71 |
| $NH_4Cl$ | 0.0632 | 3.38 |
| CdO | 0.0162 | 2.08 |
| $MnCO_3$ | 0.0295 | 3.39 |
| $Sb_2O_3$ | 0.0154 | 4.50 |

For using predominantly $Ca_3(PO_4)_2$, a suitable batch for the same base to acid ratio is:

| Ingredient | Moles | Grams |
|---|---|---|
| $Ca_3(PO_4)_2$ | 0.4476 | 138.84 |
| $Ca_2P_2O_7$ | 0.0524 | 8.076 |
| $CaF_2$ | 0.1500 | 11.71 |
| $NH_4Cl$ | 0.0632 | 3.38 |
| CdO | 0.0162 | 2.08 |
| $MnCO_3$ | 0.0295 | 3.39 |
| $Sb_2O_3$ | 0.0154 | 4.50 |

Alternatively, the Mn and Cd ingredients (but not the halides) can be pre-reacted with the $Ca_3(PO_4)_2$, giving a suitable batch having a base to acid ratio of 9.90/6 such as:

| Ingredient | Moles | Grams |
|---|---|---|
| $Ca_{2.9086}Mn_{0.0590}Cd_{0.0324}(PO_4)_2$ | 0.5000 | 156.70 |
| $CaF_2$ | 0.150 | 11.71 |
| $NH_4Cl$ | 0.632 | 3.38 |
| $Sb_2O_3$ | 0.0154 | 4.50 |

A preferred firing procedure is to fire the above-identified batches, either in air in semi-closed vessels, or in a nitrogen atmosphere for two to four hours at 1000°–1200°C, then comminute and blend the material and fire again in air for two to four hours at 1000°–1200°C.

Figure 2:
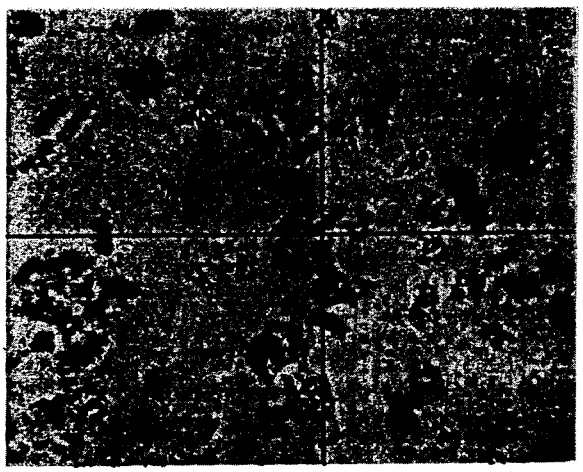
FIG. 2 is a photomicrograph taken at 500X magnification showing a phosphor of the prior art using $CaHPO_4$ as the phosphate ingredient. The phosphor is suspended in a liquid of refractive index of 1.634, selected to nearly match the refractive index of the phosphor itself.
Figure 3:
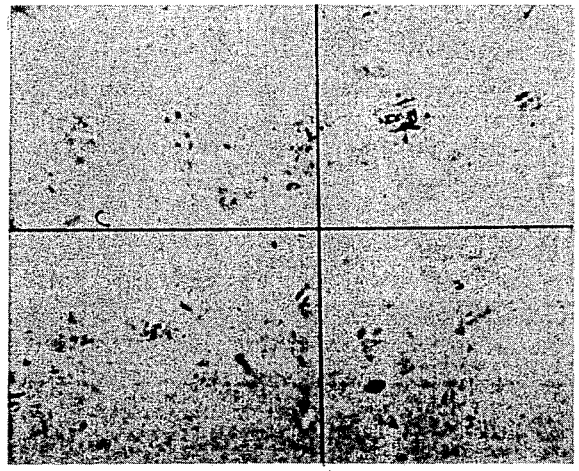
FIG. 3 is a photomicrograph similar to FIG. 2 except that the phosphor was produced according to the invention using $Ca_2P_2O_7$ as the phosphate ingredient.
Figure 4:
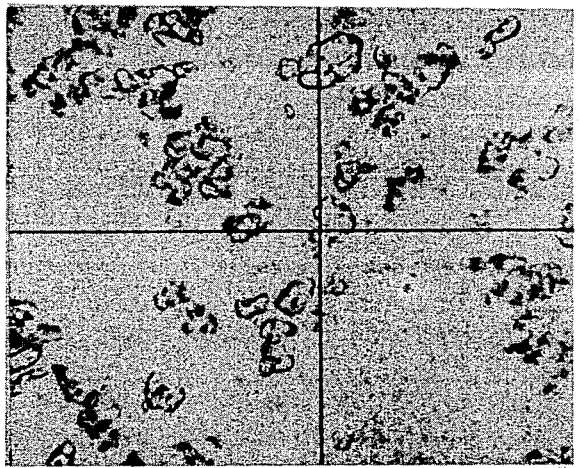
FIG. 4 is the same type of photomicrograph as FIG. 3 except that a refractive index of liquid 1.458 was used to show by contrast the size and shape of the phosphor particles. This refractive index is a substantial mismatch from the refractive index of the phosphor particles.

FIG. 2 shows as black spots porosity in calcium halophosphate phosphor produced according to the prior art. The phosphor is suspended in a liquid with a 1.634 index of refraction, essentially matching that of the phosphor itself. In contrast, FIG. 3 shows phosphor produced according to the invention using $Ca_2P_2O_7$ as the phosphate ingredient. Occasional black dots probably indicate some remaining porosity, but a much smaller extent of porosity than is evident in the prior art from FIG. 2. FIG. 4 shows the size and shape of phosphor particles made according to the present invention. The particles are shown by contrast in a non-matching liquid of refractive index of 1.458. As can be seen by comparing FIGS. 2 and 3, the extent of porosity is a statistical phenomenon which cannot be readily measured directly such as by counting pores. However, since the deleterious effect of such porosity in phosphor particles is to scatter light, a quantitive measure of the light transmitted directly through a standard phosphor sample will indicate the amount of porosity. Of course, the greater the porosity, the more light is reflected internally in the phosphor particle, and therefore the less light is directly transmitted through the phosphor sample. On a statistical basis, such a measurement has been found to be reproducible and accurate in characterizing the phosphor of the present invention.

Figure 5:
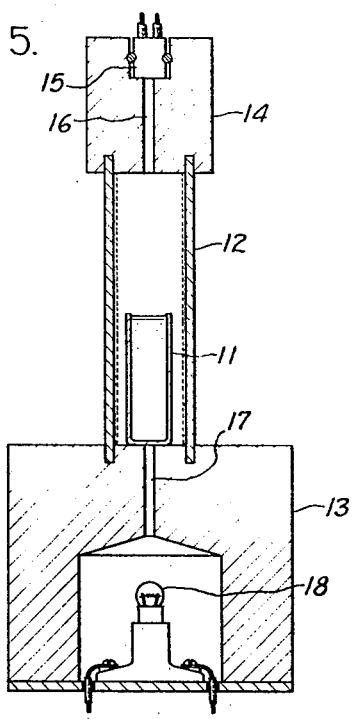
FIG. 5 is a schematic elevation partly in section of an apparatus for determining the transparency or freedom from porosity of phosphors.

FIG. 5 shows schematically the apparatus used in measuring light transmitted directly through the phosphor. A small incandescent lamp 18, the brightness of which is variable through use of an auto transformer in its current supply, is provided in a block 13 with a light-collimating channel 17. A phosphor sample is suspended in a glass vial 11 placed directly over this collimating channel 17. Light transmitted in a straight line through the vial 11 then enters collimating channel 16 in block 14 and is received and measured by photocell 15. Incrementally measured weights of phosphor for a series of measurements are suspended in a liquid, whose index of refraction essentially matches that of the phosphor, in vial 11 so that the contents of the vial appear transparent except for pores in the interiors of the phospor particles which are not filled with the liquid. Once an increment of light has been scattered out of the direct beam path by a pore in a phosphor particle, it is absorbed by the black interior wall of tube 12 to prevent it from being ultimately scattered back into the light path. The diameters of the collimating channels 16 and 17 are the same, and they define the diameter of the direct light beam. To assure constant reproducible results from one sample to another, the detection system should be operated in a linear portion of its output wherein current through the photocell varys directly with the intensity of the light impinging on it. It is also desirable to start with a vial 11 containing the matching index of refraction liquid but no phosphor to set the output of the photocell 15 at a constant value before starting each series of measurements, described below.

Calcium halophosphate phosphor is very nearly optically isotropic, and the average of its two refractive indexes is 1.638 ± 0.002 when measured using white light. A convenient liquid which can be used to match this index is 1,1,2,2, tetrabromoethane refractive index 1.6380. Other calcium halophosphate phosphors can be matched by commercially available matching index of refraction liquids. Cargille Laboratories, Inc., of Cedar Grove, New Jersey, sells such liquids in series including from index of refraction 1.460 to 1.700 in intervals of 0.002. Thus, a suitable matching liquid can be selected for any particular phosphor. What is being tested is the phosphor itself in the condition in which it has been manufactured. If the phosphor is scraped from a lamp tube for testing, care should be taken to assure that other materials such as adherence additives do not interfere with test results.

The degree of attenuation of light passing through the sample in the vial is directly proportional to both the concentration of voids in the phosphor and the amount of suspended phosphor in the light path. Labeling as $I_o$ the intensity of detected light passing through vial 11 with its matching index of refraction liquid without any phosphor suspended therein and labeling as $I$ the level of detected light passing through vial 11 with the phosphor suspended therein, the following relation applies:

$$I/I_o = \exp(-S_h l(w/v)$$

wherein:

$S_h$ is a scattering constant characteristic of a particular phosphor sample;

$l$ is the length of the light path through the sample;
$v$ is the volume liquid plus phosphor; and
$w$ is the weight of the phosphor sample.

Quantities $l$ and $v$ are constants determined by the design of the apparatus and the procedure. $w$ is measurable and independently variable. Rewriting the equation and differentiating gives:

$$[\delta \log (I/I_o)/\delta w] = -0.4342\, S_h(l/v)$$

Thus, the scattering power $S_h$ can be determined from the slope of the plot of log $I/I_o$ as a function of the weight of the phosphor added to a given quantity of matching index of refraction liquid in the vial 11.

Figure 6:
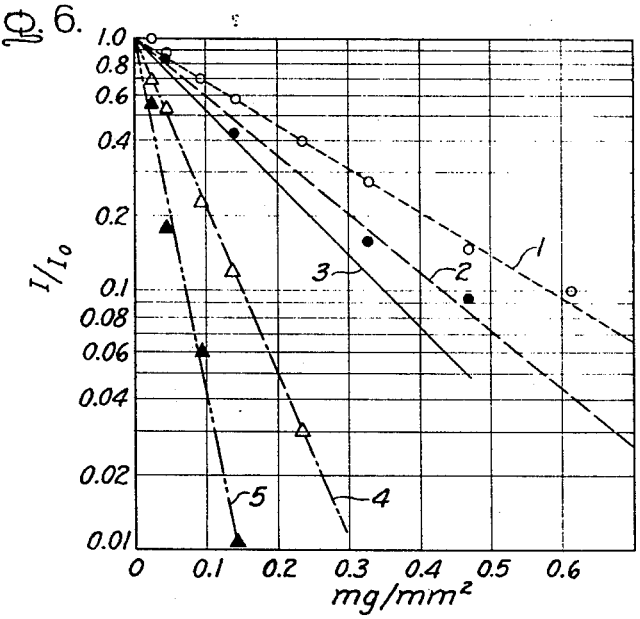
FIG. 6 is a graphical representation of lines showing the attenuation of directly transmitted light in particulate phosphors suspended in a matching index of refraction liquid plotted against the concentration of phosphor in the light path, showing phosphors of the prior art, phosphor of the present invention, and the limits of the claims of the invention.

Series of tests were run with each of several types of phosphors, adding incremental weights of phosphor between each test. When the phosphor is added, the sample is shaken vigorously and the reading taken while the phosphor is well suspended in the liquid. Vials 11 should either have optical flats on their bottoms or they should be selected to give identical results from vial to vial. The resistance of the photocell is inversely proportional to the intensity of the light, therefore the ratio of initial cell resistance to cell resistance with the phosphor in the light path, $R_o/R$, is proportional to $I/I_o$. $I/I_o$ is measured and normalized to 1.0 with no phosphor in the vial and then measured successively for incremental additions of phosphor which are expressed in terms of milligrams of phosphor per square millimeter of light path (the cross section of collimating tubes 16 and 17). This data is plotted as in FIG. 6.

Curve 1 was obtained using $Ca_2P_2O_7$ as the phosphate intermediate and $NH_4Cl$ as the chloride intermediate. Curve 2 used $Ca_3(PO_4)_2$:Mn as the phosphate intermediate and $Ca_2ClPO_4$ as the chloride intermediate. Curve 4 was obtained using $CaHPO_4$ of the prior art as the phosphate intermediate and $NH_4Cl$ as the chloride intermediate. Curve 5 was obtained using $CaHPO_4$ as the phosphate intermediate and $Ca_2ClPO_4$ as the chloride intermediate. Curve 3 has a slope of $-2.7$ mm$^2$/mg and is the lower limit of curves for phosphors of the invention. The slope can be expressed as the negative of the reciprocal of value of mg/mm$^2$ between the $I/I_o$ values of 1.0 and 0.1. Curve 1 has a slope of $-1.7$ mm$^2$/mg. Curve 2 has a slope of $-2.3$ mm$^2$/mg. Curve 4 has a slope of $-6.5$ mm$^2$/mg. Curve 5 has a slope of $-16.7$ mm$^2$/mg. Phosphors of the invention have a slope less negative than $-2.7$ mm$^2$/mg, and therefore have lines above line 3 on FIG. 6. The relations of measuring apparatus and techniques of the invention are constant from phosphor to phosphor and should give essentially uniform and reproducible results.

The foregoing is a description of illustrative embodiments of the invention, and it is applicant's intention in the appended claims to cover all forms which fall within the scope of the invention.

We claim:

1. A process of preparing relatively porosity-free calcium halophosphate phosphor which comprises the steps of:
   producing $Ca_2P_2O_7$ by firing $CaHPO_4$ at a temperature range of about 900° to 1230°C for about one to three hours;
   blending the $Ca_2P_2O_7$ with other phosphor ingredients comprising $CaCO_3$, $CaF_2$, $NH_4Cl$, $Sb_2O_3$, $MnCO_3$, $CdO$;

firing the blend at a temperature range of about 1000° to 1200°C for about one to two hours to first form the phosphor; and comminuting, blending and refiring the phosphor at about 1000° to 1200°C for about one to two hours.

2. A process of preparing relatively porosity-free calcium halophosphate phosphor which comprises the steps of:

producing $Ca_2P_2O_7$ by firing $CaHPO_4$ at a temperature range of about 900° to 1230°C for about one to three hours in the absence of halides and other phosphor ingredients;

blending the $Ca_2P_2O_7$ with other phosphor ingredients comprising $CaCO_3$, $CaF_2$, $NH_4Cl$, $Sb_2O_3$, $MnCO_3$, $CdO$;

firing the blend at a temperature range of about 1000° to 1200°C for about one to two hours to first form the phosphor; and comminuting, blending and refiring the phosphor at about 1000° to 1200°C for about one to two hours.

* * * * *